United States Patent [19]
Riffle et al.

[11] Patent Number: 6,020,063
[45] Date of Patent: Feb. 1, 2000

[54] COMPOSITES OF THERMOSETTING RESINS AND CARBON FIBERS HAVING POLYHYDROXYETHER SIZINGS

[75] Inventors: Judy S. Riffle; John J. Lesko, both of Blacksburg; Norman Broyles, Pearisburg, all of Va.; Stephen V. Davis, Rochester, N.Y.; Nikhil Verghese, Blacksburg, Va.

[73] Assignee: Virginia Tech Intellectual Properties, Inc., Blacksburg, Va.

[21] Appl. No.: 09/126,077

[22] Filed: Jul. 30, 1998

Related U.S. Application Data

[60] Provisional application No. 60/054,501, Jul. 31, 1997.

[51] Int. Cl.⁷ ..................................................... B32B 17/00
[52] U.S. Cl. .......................... 428/357; 428/105; 428/361; 428/375; 428/392; 428/408
[58] Field of Search ..................................... 428/105, 357, 428/361, 375, 392, 408; 523/423, 529, 531, 930, 530

[56] References Cited

U.S. PATENT DOCUMENTS

| | | |
|---|---|---|
| 4,029,837 | 6/1977 | Leatherman . |
| 4,228,209 | 10/1980 | Chavannes . |

FOREIGN PATENT DOCUMENTS

| | | |
|---|---|---|
| 0 408 042 A2 | 1/1991 | European Pat. Off. . |
| 2 467 692 A1 | 4/1981 | France . |

*Primary Examiner*—Richard Weisberger
*Attorney, Agent, or Firm*—Whitham, Curtis & Whitham

[57] ABSTRACT

Composite material having carbon fibers embedded in a polymeric matrix comprising a thermoset resin, where the carbon fibers are precoated with a sizing agent comprising a saturated polyurethane or polyhydroxyether before being embedded in the resin. The invention also contemplates processes for making this composite material and intermediate products thereof.

8 Claims, 6 Drawing Sheets

"Vinyl Ester Resins"

COMPOSITES OF THERMOSETTING RESINS AND CARBON FIBERS HAVING POLYHYDROXYETHER SIZINGS

This appln claims benefit of provisional appln 60/054,501 filed Jul. 31, 1997.

BACKGROUND OF THE INVENTION

1. Field of the Invention

This invention generally relates to composites of thermosetting resins and carbon fibers having polyhydroxyether sizings located at the interface (interphase region) of the fiber surfaces and the resin.

2. Description of the Prior Art

Polymeric matrix composites, also known as "fiber-reinforced plastics", involve products in which a polymeric matrix is combined with reinforcing fibers. The reinforcing fiber is embedded in the polymeric matrix material, and the polymeric matrix protects the brittle reinforcing fiber and transfers the load to the fiber. Composites advantageously combine strength, light weight, versatility in shape selection, and corrosion resistance, among other things.

Composites formed of glass fiber-reinforced thermosetting resins have been widely used for a number of years. However, in the case of such prior glass fiber-reinforced composites, a problem stems from the poor moisture stability of the glass fibers. That is to say, the glass fibers sustain structural damage when moisture (liquid or vapor infiltrating the resin matrix) contacts the fiber surfaces and the moisture is alternately frozen and thawed. This scenario arises when the glass fiber-reinforced composite part is subjected to regular outdoor exposures in a moist climate including temperature swings or temperature cycling over the freezing temperature of water. As a consequence, the glass fibers become fatigued, embrittled and ultimately fail. Therefore, despite the relative low cost of glass fiber-reinforced composites, they remain ill-suited for many outdoor applications available for composites.

Carbon fibers have been explored as an alternative type of high strength, fibrous reinforcement for resin matrices of composites. Carbon fibers have better environmental resistance against moisture, lighter weight (lower density), and higher stiffness as compared to glass fibers. However, the problem encountered with usage of carbon fibers in prior composites has been poor product durability. This poor durability of the composite has been attributed to bonding failure occurring at the interphase region of the resin matrix and the carbon fiber surfaces. As a consequence, the resin matrix eventually jiggles loose from the carbon fibers, whether in discrete fiber form or in fabric form, to cause failure of the composite.

The interphase region is a region of finite mass located at the fiber/matrix interface. This region has gradients in physical properties that greatly influence the performance of the final composite.

Carbon fibers and vinyl ester resins, in particular, have a compatibility problem which has proved a considerable prior obstacle to the use of these systems. This incompatibility has frustrated prior efforts to achieve an appreciable bond between this matrix system and carbon fiber surfaces per se. This has been disappointing because considerable cost advantages can be garnered from the carbon fiber-reinforced vinyl ester system due to the initial low material cost of the vinyl ester polymer, and the short time and low temperature required to fully cure these systems. The short hardening times and lower cure temperatures associated with this resin system translate into reduced production cycles which further reduces production costs.

In light of such fiber and resin compatibility problems, the character of the bond between fiber and matrix in composite materials has attracted considerable prior interest and scrutiny in the field, as indicated by the following patents.

Polyhydroxyethers are known interface materials, i.e., sizing materials, for glass fiber reinforced composites. The process of applying such sizing materials to a fiber surface prior to its impregnation with the matrix material is generally referred to as sizing. As to carbon fiber reinforced composites, U.S. Pat. No. 4,781,947 to Saito et al. teaches a sizing agent applied as a precoating to a carbon fiber, where the sizing agent is an unsaturated urethane compound produced by a reaction of an unsaturated alcohol with an isocyanate which is able to couple the carbon fiber with an unsaturated polyester resin or vinylester resin. The function of the sizing agent is to hydrogen bond to the fiber via the urethane bond and to crosslink with the matrix via the double bond present in the sizing material.

SUMMARY OF THE INVENTION

It is an object of this invention to provide a composite of thermosetting resin and carbon fibers having improved durability and stability.

According to the invention, there is a composite material having carbon fibers embedded in a polymeric matrix comprising a thermoset resin, where the carbon fibers are precoated with a sizing solution containing a polyhydroxyether sizing agent before being embedded in the resin.

The sizing agents usable in the practice of this invention are polyhydroxyether materials that are compatible with the carbon fiber surfaces and compatible or miscible with the resinous matrix material. The sizing agent forms a thin, ductile coating film on the exposed surfaces of carbon fibers which promotes adhesion between the polymeric matrix and carbon fibers, thereby endowing the composite product with enhanced durability.

A sizing solution containing the sizing agent is applied to the exterior surfaces of carbon fibers in a convenient manner, then dried to fuse the sizing agent to the fiber surfaces; thereby providing a sized carbon fiber having enhanced capability to couple to thermosetting resins. In this way, the sizing agent is effectively confined to the interfacial (interphase) region between the surfaces of the carbon fibers and the resin matrix at the time of curing the composite. An improvement in composite performance results from the enhanced bond achieved between the carbon fibers and resinous matrix. This enhanced fiber-to-resin matrix bond serves to reduce the initiation and propagation of damage to the fibers, resin matrix and/or fiber-resin interphase region, which retards the overall degradation of the composite during the course of fatigue cycling. Consequently, the durability of the inventive composite product under cyclically applied stresses is significantly improved as compared to composites reinforced with carbon fibers lacking the sizing treatment of this invention.

Also the types of thermosetting resins used as the matrices which can afford improved bonding efficacy to carbon fibers is not particularly limited in this invention. For instance, suitable thermosetting resin matrices for this invention include unsaturated polyesters, such as vinyl esters, and phenolic matrices.

The composites of this invention are well-suited for many applications inclusive of aggressive outdoor environments.

The inventive composites can be formed into virtually any desired configuration and shape. For example, the carbon fiber-reinforced vinyl ester composites made by this invention are desirable for many applications, including civil infrastructure, marine uses, off-shore oil rigs, and the like, where high strength is needed. The inventive carbon-fiber-reinforced vinyl ester composites systems also are suited to applications in the automotive, rail, marine industries where lightweight durable exterior body parts are needed. Also contemplated are heavy construction applications including wrapping concrete structures in the inventive composite to reduce weathering, such as on bridges and overhead highways. Also, the phenolic matrix composites made by the invention are also applicable for uses where non-flammability is required, such as in aircraft interiors, off-shore oil rigs, submarines and ships, subways, mine shafts, and so forth.

This invention also encompasses intermediate products related to composite precursor materials developed during processing where the sized carbon fibers are embedded in a thermosetting resin system that is not yet fully cross-linked (e.g., a B-stage resin). For example, certain prepreg materials developed by the process of the invention can be conveniently handled and/or appropriately stored until a later time when it is desired to shape and then fully cure and harden (solidify) the composite resin.

BRIEF DESCRIPTION OF THE DRAWINGS

FIG. 7. ○ Plastic and ○ Elastic components of the indents produced across an interphase region of a vinyl ester-carboxy modified poly(hydroxyether) bilayer. Dotted lines represent the average depth of indents (solid boundary lines represent (2 standard deviations) In vinyl ester and carboxy modified poly(hydroxyether) respectively FIG. 8. ● Plastic and ○ elastic components of the indents produced across an interphase region of a vinyl ester-poly(hydroxyether-ethanolamine) bilayer. Dotted lines represent the average depth of indents in vinyl ester and poly(hydroxyether-ethanolamine) respectively. Solid boundary lines represent 2 standard deviations.

DETAILED DESCRIPTION OF THE PREFERRED EMBODIMENTS OF THE INVENTION

Forms of carbon fiber-reinforced composites also known as "carbon fiber-reinforced plastics") encompassed by the invention include fiber reinforcement, fiber preforms, fiber prepregs, and fiber molding compounds. For purposes of this invention, all such composite forms are associated with products in which a thermosetting polymeric matrix is combined with carbon reinforcing fibers pretreated with a polyhydroxyether-sizing agent.

The starting carbon fiber usable in this invention include carbon or graphite filamentary material. In general, the carbon fiber is prepared from organic, carbon-rich filamentary material, referred to as the "carbon fiber precursor", which is subjected to combinations of stretching and carbonization in inert atmospheres at high temperatures according to conventional processing techniques. The surface of the carbon filaments produced is preferably oxidized to further promote adhesion to polymeric matrices. Otherwise, the carbon fiber starting materials preferably are unsized before treatment with the sizing agent of the present invention.

Suitable carbon fiber precursors include polyacrylonitrile (PAN)-based fibers. Suitable carbon fibers derived from PAN fibers include those commercially-available from ZOLTEK and from Hexcel, Corp, which are oxidized, unsized carbon fibers. Carbon fibers can also be derived from petroleum pitch-based fibers. Also, graphite fibers can be derived from rayon-based fibers.

Figure 2:
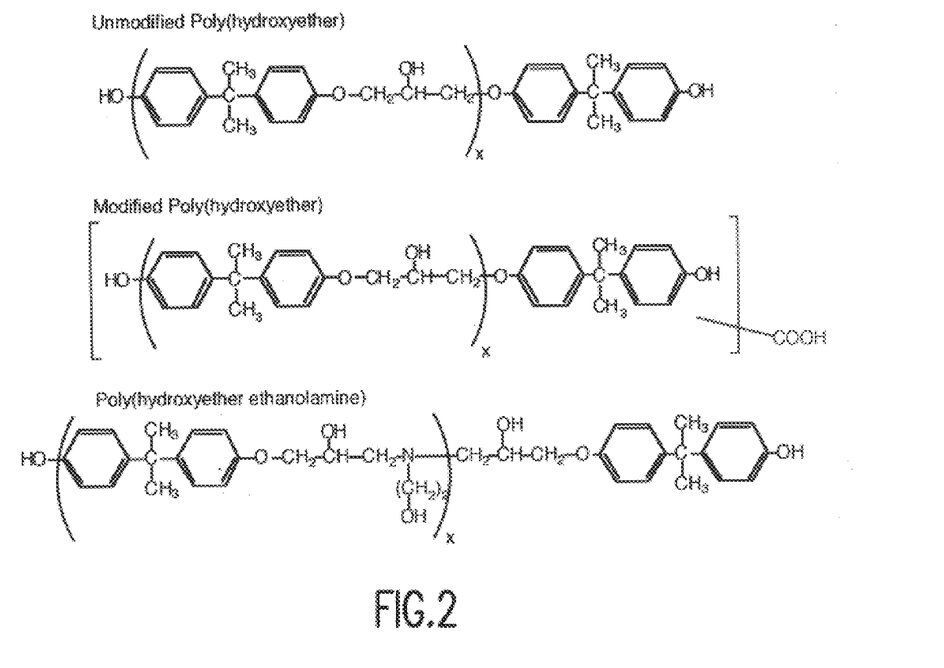
FIG. 2. Thermoplastic sizing materials for carbon fiber reinforced vinyl ester matrix composites.

The polyhydroxyether sizing compounds have ether linkages in the molecular backbone and hydroxyl group substituents. An example of a suitable polyhydroxyether compound sizing agent for this invention is shown in FIG. 2(a).

An important aspect of the present invention is that the carbon fiber is sized with a solution containing the sizing agent before the carbon fiber is contacted with a thermosetting resin in the production of the composite. The sizing agent can be applied so as to form a substantially uniform, continuous surface film on the bare exterior surfaces of the carbon fibers.

In general, the range at which the sizing agent, i.e., polyhydroxyether, is coated upon the carbon fibers is at least a minimal amount effective to promote adhesion between the sized carbon fibers and the resin matrix of the composite. If the amount of add-on of sizing agent to the fiber surfaces becomes too great, no additional benefit is achieved. The coating thickness of the sizing agent on the carbon fibers was provided so as to be related to the concentration of sizing agent in the sizing solution bath, as generally understood and practiced in the carbon fiber industry. The concentration of the sizing agent in the sizing solution generally will be about 0.1 to 5.0 wt. % with respect to the carbon fibers in the case of aqueous dispersions. The amount of the sizing agent on the sized fibers will generally be about 0.1 to 5.0 wt. % with respect to the carbon fibers. The addition of the polyhydroxyether sizing in very small percentages of the total composite, e.g., less than 1.0 weight percent, surprisingly drastically improves the durability of the composites.

The sizing solution can be applied to the carbon fibers in any convenient manner, such as by impregnation bath, wash coating, and the like. The carbon fiber or fabric made therefrom can be pulled or drawn through an impregnation bath filled with the sizing solution by equipment arrangements conventionally used and available for applying sizing to fibers/fabrics. Full immersion techniques are preferred for application of the sizing solution to facilitate formation of a uniform, continuous coating of the sizing agent on the exposed fiber surfaces. The amount of sizing solution, and thus sizing agent, finally applied to carbon fibers before drying can be controlled by mangle roller after applying the sizing solution, by rotational velocity of an oiling roller and the coating density, or by conveying the fiber or fabric through the nip of opposing dies (or rollers) after application of the sizing solution.

After application of the sizing solution to the fiber surfaces, any appropriate drying method can be used for drying the sizing coating to volatize the liquid vehicle and leave the sizing agent as a film residue attached to the fiber surfaces. Drying of the sizing solution coated upon the carbon fibers can be accomplished by heat and/or air drying methods.

By applying and drying the sizing agent upon the carbon fiber surfaces before any contact with the matrix resin, it is possible to effectively confine the sizing agent to the interfacial region between the carbon fiber surfaces and the matrix resin. The matrix resin, in its bulk, thus is devoid of sizing agent in this invention. That is, the sizing and matrix materials will interdiffuse following application of the matrix resin, thus forming a thin interphase region with a graded sizing/matrix composition distribution. The sizing will be effectively confined to this "interphase region."

In addition to the sizing agent, the sizing solution according to the invention may also contain, if necessary, other adjuvants such as a lubricant, an emulsifier, a conventional sizing agent, and so forth, as long as the effects achievable by the present invention are not frustrated. Examples of such other adjuvants include those described in U.S. Pat. No. 4,904,818, which description is incorporated herein by reference.

The carbon filaments, when sized according to the invention, can be treated in continuous or chopped monofilamentary form. Alternatively, the carbon filaments can be sized as continuous or discontinuous lengths of staple fibers, yarns, tows, or fabrics (woven or nonwoven) formed of the carbon filaments. Preferably, the carbon fibers are sized in continuous, filamentary form or woven fabric form.

The polymeric matrices prepared in the composites of this invention are thermosetting type. Classes of thermosetting resins useful in the practice of the invention include, for example, unsaturated polyesters (e.g., vinyl esters), thermosetting polyimides, phenolic resins, and polyurethane resins.

Thermoset resins are derived from thermosetting resin systems which form highly cross-linked (thermoset) polymers when cured. The thermosetting resin systems encountered in this invention generally include a combination of appropriate monomers for forming the thermoset resin polymer desired, and this combination of monomers constitutes a liquid thermosetting resin precursor solution. The thermosetting resin systems are applied to the sized carbon fibers or sized carbon fiber fabrics in the B-stage. The thermosetting resins are not fully cross-linked until after the composite material has been configured into any desired permanent shape.

The unsaturated polyesters are unsaturated resins with a polyester linkage and include $\alpha,\beta$-unsaturated polyester resins and vinyl ester resins. The $\alpha,\beta$-unsaturated polyester resins are obtained by dissolving an unsaturated polyester, which is obtained by condensation of an $\alpha,\beta$-unsaturated dicarboxylic acid (or anhydride thereof), with or without a second dicarboxylic acid (or anhydride thereof), and glycol, in an olefinic unsaturated monomer capable of polymerizing and reacting with unsaturations in polyester molecules to form a three-dimensional network. Useful examples of these materials are described in U.S. Pat. No. 4,904,818, which description is incorporated herein by reference.

The typical molecular weight of the unsaturated polyester molecules formed from the condensation of the $\alpha,\beta$-unsaturated dicarboxylic acids (or anhydride thereof) with or without a second dicarboxylate acid monomer, and glycol is about 1000–3000. The $\alpha,\beta$-unsaturated dicarboxylic acids or anhydrides include, for example, maleic acid or anhydride, fumaric acid (unsaturated), and itaconic acid. Supplementary saturated (aromatic) dicarboxylic acids also can be used as difunctional acids, such as o-phthalic acid or anhydride, isophthalic acid, terephthalic acid, and adipic acid (saturated). The glycols include ethylene glycol, diethylene glycol, propylene glycol, dipropylene glycol, and glycerol.

The olefinic unsaturated monomer is a styrene monomer or another vinyl monomer such as $\alpha$-methyl styrene, vinyltoluene, methylmethacrylate, diallylphthalate, and triallylcyanurate. Minor amounts of olefinic unsaturated comonomers may also be incorporated into these systems.

The $\alpha,\beta$-unsaturated polyester resin systems can include other adjuvants, such as curing inhibitors, initiators (catalysts), accelerators, extenders, fillers, and so forth, known in this field.

As understood in the field, the density of unsaturations in the unsaturated polyester resins, as well as the proportion of polymerization monomer, determine the final cross-link density, or the "tightness" of the molecular network and, hence, its stiffness and hardness.

Useful vinyl ester resins involve short linear molecules resulting from the esterification reaction of epoxide group-terminated molecules, such as diglycidyl ether of bisphenol-A with unsaturated acids, such as acrylic acid or methacrylic acid. Vinyl ester resins feature ester linkages and vinyl-type unsaturations, hence the name vinyl ester resins. The diglycidyl ether of bisphenol-A can be derived from bisphenol A and epichlorohydrin, cresol-novolac epoxy resins and phenol-novolac resins, including those described in U.S. Pat. No. 4,904,818, which description is incorporated herein by reference. That is, the novolac resins are produced by reacting phenol or a substituted phenol with formaldehyde in acid solution. The novolacs suitable for reaction with epichlorohydrin contain from about 2 to 6 phenolic hydroxyl groups. These vinyl ester resins have acrylate or methacrylate groups on its terminals. The main chain of these vinyl ester resins is constituted from bisphenol or novolac molecular structure.

The cross-linking of these vinyl ester reactants into three-dimensional networks, like regular unsaturated polyester resins such as described herein, usually incorporates a monomer such as styrene. Therefore, in one embodiment, a vinyl ester polymer of the invention includes a thermoset resin derived from diacrylate oligomers co-polymerized with styrene monomers or the like.

Useful phenolic type matrix resins for the present invention include thermosetting polymers obtained by the condensation of phenol or substituted phenols with aldehydes such as formaldehyde, acetaldehyde, and furfural and phenol. Epoxidized novolak resin is another type of phenolic resin useful in the invention.

The matrix resins of this invention can also contain other functional additives, if necessary, such as impact modifiers, pigments, heat stabilizers, lubricants, processing aids, fillers, and plasticizers, as long as the effects achievable by the present invention are not frustrated. The types of compounds useful for performing these desired functions are known in the art.

The (pre)sized carbon fibers according to this invention can be combined with the matrix-forming resin in a number of forms including continuous filaments, or as chopped fibers, as woven fabrics, or nonwoven webs made of continuous filaments or chopped fibers.

The proportion of sized carbon fibers mixed with and embedded in the resin matrix is not particularly limited and will depend, at least in part, on the ultimate end use envisaged for the finished composite material with consideration of the product strength and stiffness desired as tailored by adjusting the fiber content. The sized carbon fibers will generally constitute about 3 wt. % to about 80 wt. % of the total weight of the composite material product, more typically about 3 wt. % to about 70 wt. %, the balance being constituted by the resin matrix and its constituents.

Any number of known techniques for manufacturing fiber-reinforced plastic parts can be used to impart a desired shape to the carbon fiber-reinforced composites of this invention during their production. In general, the (pre)sized carbon fibers can be embedded in the resinous polymer through either open-tool processing or closed-mold processing.

For example, open-tool processing generally involves use of a single tool surface to give a part its shape. Conventional open-tool techniques adaptable to the practice of this invention include contact molding by hand lay-up, spray-up, or vacuum bag; filament winding; centrifugal casting; pultrusion; continuous laminating; and formation of laminated parts by combination of the carbon fiber-reinforced thermosetting resins (as backing) with rigidized thermoformed sheets (as skin).

Closed-mold processing, also referred to as "matched-mold" or "matched die" processing, generally involves formation of a shaped part in the cavity of a mold. As known, the fiber/resin system can be managed in two basic ways in closed-mold processing. In one basic approach, the (pre) sized fiber-reinforcement and resin are combined prior to their introduction into the mold. The combination of sized fibers and resin can be accomplished just prior to their introduction into the mold as a "pre-mix", or alternatively, the combination of sized fibers and resin can be prepared by specialized compounders and supplied as ready-to-mold stock as "compounds". In a second basic approach, the sized fiber and resin are combined within the mold cavity (at-press or in-mold combination). In this case, the sized fiber reinforcement is placed in the mold, either in the form of cut pieces of mat or woven fabric, or as preforms prepared in advance. A suitable amount of resin can be placed under, or poured over the fiber reinforcement just prior to closing the mold (hot or cold press molding), or the resin can be injected into the closed mold in low viscosity form to at least partly if not fully engulf and embed the fibers.

Conventional closed-mold techniques adaptable to the practice of this invention generally include hot-mold processing techniques (i.e., using temperature-activated thermosetting resins) or, alternatively, cold mold processing (i.e., using a catalyst-activated resin. More specific categories of conventional closed-mold techniques that can be used in the practice of this invention include, for example, resin transfer molding (RTM), structural reactive injection molding (SRIM), cold press molding, compression molding, batch laminating, transfer molding, injection molding, elastic reservoir molding (ERM), thermal expansion resin transfer molding (TERTM), ultimately reinforced thermoset reaction injection (URTRI), and resin infusion molding (RFI).

The composites of the invention also can be processed by pultrusion techniques.

The equipment necessary for preparing composite materials in the various manners described hereinabove are widely available and the appropriate techniques for operating and using such equipment will be appreciated by one of skill in the field.

One basic scheme for making a composite material of the invention is as follows. A carbon fiber, or a fabric made of same, is coated with a sizing solution containing a dispersion of the polyhydroxyether sizing agent described in an aqueous solution. The sizing coating, after application to the fiber or fibrous fabric, is dried to eliminate the aqueous medium and fuse the sizing agent to the fiber surfaces. A fabric formed from the sized fibers, or sized fabric per se, is cut to desired dimensions as needed. Layers of such fabric are stacked and placed inside a mold and a thermosetting resin system is injected into the mold cavity, permeating the fabric and filling the mold. The resin permeating the fabric is then cured (cross-linked) by heat and/or catalytically sufficient to harden and solidify the resin. The sizing agent located at the interface between the carbon fiber surfaces and the resin promotes adhesion between the fibers and resin matrix, thereby enhancing the durability of the composite produced.

More specifically, a process for making the carbon fiber-reinforced composite material of this invention can be summarized as involving the following steps, in this sequence, of:

(a) coating carbon fibers with the dispersion of the aqueous sizing solution containing the sizing agent dispersed in a volatizable liquid vehicle;

(b) drying the sizing solution effective to volatize at least substantially all the liquid vehicle to form sized carbon fibers;

(c) embedding the sized carbon fibers in a thermosetting resin system to provide an intermediate product; and (d) heating the intermediate product effective to cross-link the thermosetting resin system to form a solidified, thermoset resin matrix attached to the carbon fibers.

This process of the invention is adaptable to either open-tool processing or closed-mold processing techniques. The composite materials of the invention can be readily shaped into desired shapes up until a time when the resin is fully cross-linked to fix the shape.

Carbon fiber-reinforced composites were fabricated as described below to investigate the workability and durabilities of the composites of the present invention.

EXAMPLE

Fiber reinforced polymer matrix composites are finding increased use in structural applications where long term mechanical and environmental durability are key issues. This has prompted impetus for fundamental studies to determine relationships between the structure of fiber/matrix "interphase" regions and composite durability in both our laboratories and those of others. This study describes initial interphase and composite properties for a series of carbon fiber reinforced vinyl ester matrix composites wherein the fiber sizing structure has been varied systemically along a series of poly(hydroxyether) ductile thermoplastics. The primary variable along the series is the polarity, and hence, the amount of sizing-matrix interdiffusion in the interphase regions. A number of techniques have been used to evaluate both the "macro and micro" properties of the composites as a function of interphase structure. These include atomic force microscopy and nano-indentation to map compositional gradients and mechanical properties across bi-layer films comprised of the fiber "sizings" and vinyl ester matrices. Micro-debond tests have been carried out by the Korean group to probe adhesion between the "sized" fibers and matrices. Fatigue cycling has proven to be particularly useful in highlighting the influence of the tailored interphases on the durability of the carbon fiber/vinyl ester composites.

Composite fatigue properties of AS4/vinyl ester composites having a tough, ductile polyhydroxyether thermoplastic in the "interphase" region can be improved dramatically (relative to using unsized fiber) with <1 wt. % of the sizing in the composite. The thermoplastic sizing dissolves in the thermoset at the cure temperature, but microphase separates into discrete domains during matrix curing. A gradient in chemical composition and morphology results in moving outward from the fiber into the thermoset matrix. It is hypothesized that the unusually good fatigue resistance of composites from these materials can be at least partially attributed to this interphase gradient. Our goal is to use micromechanical properties measured in interphase regions in a continuum mechanics model to predict composite performance properties.

Polymer composites consisting of continuous reinforcing fibers embedded in polymeric matrices are becoming increasingly important as structural components for the infrastructure and construction industries due to their improved corrosion resistance and high strength/weight ratios compared to traditional metallic materials (1). Carbon and glass reinforcing fibers with high moduli and strengths are typically used in these composites as the primary load bearing constituents. Rapidly processable polymer matrix resins include thermosetting materials such as epoxies, the so-called "vinyl esters" (e.g., dimethacrylate oligomers diluted with styrene), and "unsaturated polyesters" (polyester oligomers diluted with styrene). The matrices protect the brittle reinforcing fibers, bind them together, and transfer loads to the fibers in the vicinity of fiber breaks via fiber-matrix adhesion.

The fatigue performance of these composites has been shown to be particularly sensitive to the structure of the fiber-matrix interphase regions (2–6). The "interphase" can be defined as the region of finite mass between the fiber and matrix with properties different from either the fiber or the matrix (2). One method for controlling both fiber-matrix adhesion and the physical properties of the interphase region is to apply a sizing (i.e., a fiber coating from a polymer solution) to the surface of the fibers prior to impregnation with the matrix resin. The sizing may or may not form a gradient in chemical composition as one moves outward from the fiber caused by interdiffusion of the fiber sizing with the matrix resin during the cure reaction. Broyles et al. (5) tested the durability and lifetime of vinyl ester matrix composites consisting of fibers sized with two dissimilar thermoplastics. The carboxylate modified poly (hydroxyether) sizing, a ductile engineering thermoplastic, showed a 20-fold increase in the notched fatigue life of the composite compared to the unsized case, while that sized with the brittle poly(vinylpyrrolidone) exhibited only a 6-fold increase. Relationships between the structure of these fiber-matrix interphase regions and the properties of the composites are not adequately understood. For example, the relative roles and importance of fiber-sizing adhesion, sizing-matrix adhesion, interphase morphology and interphase mechanical properties are not at all clear. This paper addresses the design and characterization of carbon fiber-vinyl ester interphase regions. Initial data defining the relationships between interphase structure and composite performance are presented.

Interphase regions have been designed by tailoring tough ductile thermoplastic sizings to partially diffuse into a thermosetting matrix resin during cure to enhance sizing-matrix adhesion. The chemical and physical interactions between the fiber, sizing, and resin during composite fabrication result in an interphase region with a gradient in chemical composition and mechanical properties. It is anticipated that this mechanical gradient may be beneficial towards improving composite performance. It is also anticipated from previous results (7) that the environmental durability of the composites will be significantly improved.

EXPERIMENTAL

1. Materials

Figure 1:
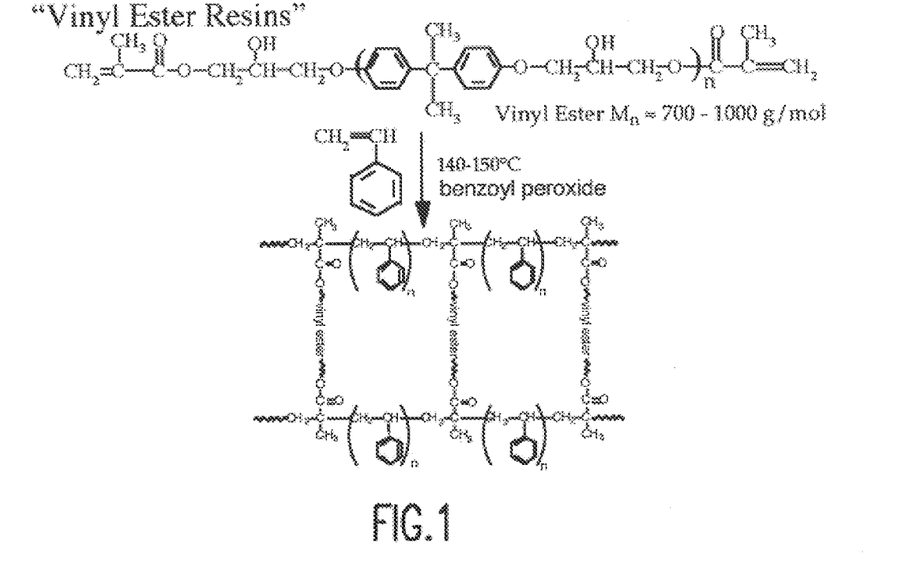
FIG. 1. Dimethacrylate ("vinyl ester")-styrene matrix components.

The fibers were Hexcel AS-4 unsized but surface treated 12K flow. The vinyl ester matrix material was kindly donated by the Dow Chemical Co. This resin was 70 wt. % vinyl ester oligomer ($M_n$ of ≈700 g/mole) terminated with methacrylate groups diluted with 30 wt. % styrene (FIG. 1). Benzoyl peroxide (Aldrich) was used as received as the initiator for the free radical cure reaction. The poly (hydroxyether) and the "carboxy modified poly (hydroxyether)" sizings were kindly donated by Phenoxy Associates, Rock Hill, S.C. (FIG. 2). The carboxylic acid modified material was a derivative of the original poly (hydroxyether) with a minor concentration of carboxylic acid groups grafted onto the backbone. This modification facilitated its dispersion in water. The carboxylic acid grafted poly(hydroxyether) was obtained as a 35 wt. % aqueous dispersion of ≈1µ average diameter particles which was diluted to 2 wt. % with water for sizing. The poly (hydroxyether ethanolamine) thermoplastic (FIG. 2) was prepared by chain extending an epoxy resin with ethanolamine and was also kindly supplied by the Dow Chemical Co. A 2 wt. % solution was prepared for the sizing process by heating 3 vol % acetic acid in water to ≈45° C. and dissolving the thermoplastic in this solution.

The fiber tow was sized on a custom made small scale sizing line (6), the tow was dried, wound onto a drumwinder, and cut to 16.5 cm length plies. The amount of carboxy modified poly(hydroxyether) sizing based on fiber weight was 1.12%. At 64% fiber volume in the composite panel, this corresponds to 0.8% by weight sizing based on the weight of the total composite. The amount of poly(hydroxyether ethanolamine) sizing based on fiber weight was 1.5 wt. %. At 60 volume % fiber in the panels, this corresponds to 0.7 wt. % sizing based on the total composite weight. The plies were stitched at 3.8–5 cm intervals to hold the fibers in place. The matrix resin was prepared for the cure reaction by dissolving 1.1 wt. % benzoyl peroxide in the vinyl ester resin at room temperature, then degassing under mild vacuum. Seven ply (crossply symmetrical about the center ply), 16.5 cm×16.5 cm panels were cured using a resin film infusion process on a Wabash (model 9112) vacuum hot press by heating from 25° C. to 150° C. over 30 min., holding at 150° C. for 20 minutes, then cooling to approximately room temperature over a period of 1 hour under pressure.

Figure 3:
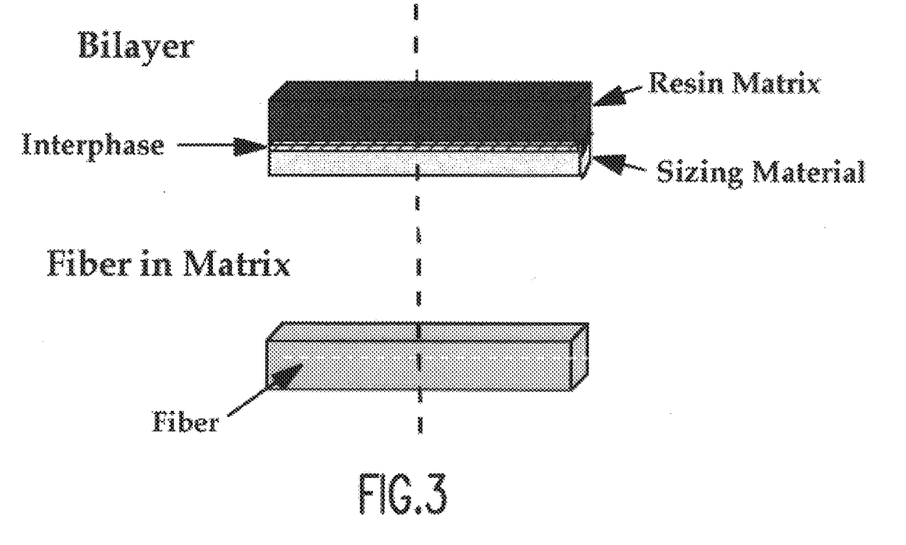
FIG. 3. Sample preparation of sizing-matrix bilayer cross-sections.

Bilayer films of the poly(hydroxyether) sizing materials and the vinyl ester matrix were prepared to study sizing-matrix interactions (FIG. 3). These films were prepared in small silicone rubber molds. First, a thin film of the poly(hydroxyether) sizing material was cast and dried; the carboxy modified poly(hydroxyether) and the poly(hydroxyether ethanolamine) films were cast from the aqueous sizing solution/dispersion, while the poly(hydroxyether) film was cast from THF; then the vinyl ester (with benzoyl peroxide initiator) was poured into the mold on top of the sizing material. This was immediately placed in a preheated over (150° C.) for 30 minutes to cure. Single fiber model composites were made by suspending a single fiber that had been sized using our custom made small scale sizing line in the same mold used for the bilayer samples, adding vinyl ester and curing under identical conditions.

2. Composite Characteristics

Fiber volume fractions of the composite panels used in these experiments were calculated by measuring their densities in air and in isopropyl alcohol. An ≈4 gram sample of each composite was dried and weighed. The sample was then immersed in isopropyl alcohol and re-weighed. The density of the composite was calculated using Archimedes' principle and equation 1

$$\rho_{composite} = W_{air}/(W_{air} - W_{IPA})\rho_{IPA} \quad (1)$$

where $\rho_{composite}$ is the density of the composite, $\rho_{IPA}$ is the density of isopropyl alcohol, $W_{air}$ is the weight of the sample in air and $W_{IPA}$ is the weight of the sample in isopropyl alcohol. The fiber volume fraction was then determined using the rule of mixtures.

$$v = (\rho_{composite} - \rho_{resin})/(\rho_{fiber} - \rho_{resin}) \quad (2)$$

where v was the fiber volume fraction calculated from equation 2, $\rho_{fiber}$ was the density of the carbon fiber, and $\rho_{resin}$ was cured resin density. The fiber volume fractions were estimated to be 0.60–0.62. The densities used for the fiber and resin were $\rho_{fiber}$=1.78 g/ml (8) and $\rho_{resin}$=1.18 g/ml (9).

As a quality control step, linear ultrasonic C-scans were conducted on all the composite materials. These tests were done using a Sonix HS1000 HISPEED instrument. A 15 MHz, 32 mm focal length sensor was used. Data was analyzed using the FlexSCAN-C software provided with the instrument. The scans were gated both to the midplane as well as to the bottom surface of the specimens. These scans indicated a larger dissipation in the poly(hydroxyether ethanolamine) composite samples as compared to the poly(hydroxyether). This was postulated to be caused by poor interface adhesion in the former case as all the other material constituents were the same and no unusual porosity was observed in either of the composite systems.

3. Atomic Force Microscopy (AFM) and Nano-identification

Bilayer samples were cut through the middle and microtomed smooth, and then the smoothed blocks were analyzed by AFM. The samples were initially trimmed with a razor blade to obtain a trapezoidal shape (≈1 mm. in length) with the interface near the middle of the trapezoid. The samples were microtomed with a Reichert-Jung Ultracut E apparatus. All samples were cut with a diamond knife at room temperature. A Digital Instruments Dimension 3000 instrument using the Nanoscope IIIa controller was used to obtain the images. The images were collected in the Tapping Mode™ using etched silicon tapping tips with spring constants in the 20–100 N/m range. The nano-mechanical properties of the bilayer samples were also studied using the AFM apparatus. Digital Instruments Indentation software and a diamond tipped cantilever with a 325 N/m spring constant was used to produce a number of nanometer size indentations in the samples. Force-nanoindentation depth curves from these indentations were then corrected to remove tip deflection of the cantilever (10). The tip deflection was calibrated using a sapphire substrate as an infinitely stiff material; and then this component was removed from the data collected from the samples under study. The force-indentation depth curves were then used to calculate the elastic and plastic components of the indents (11). The plastic component was calculated by taking the initial slope of the unloading curve and extrapolating back to zero force. The elastic component was then calculated by subtracting the plastic depth from the total depth of the indent at maximum force.

4. Mechanical Testing: Quasi-static Compression and Fatigue Tests

Quasi-static compression tests were performed on an MTS test frame to assess composite strength. A loading rate of 200 pounds per second was applied. This loading cycle was programmed into the Microprofiler that controlled the machine once a test was begun. A 5.08 cm. test gauge length was used. The specimens were loaded into the grips at a grip pressure of 7 MPa and specimen alignment was ensured with a spirit level. Emory cloth of 100 grit was wrapped around the grip sections of the specimens to prevent slip. An MTS Model 632 extensiometer with a gauge length of 2.54 cm and a maximum strain limit of 4% was used to monitor strain. Aluminum extensiometer tabs were used to hold an extensiometer and the signal from the extensiometer was amplified using a 2310 Vishay Measurements Group amplifier box.

Fatigue tests were conducted using a sinusoidal, fully reversed tension-compression (R=−1) mode at a frequency of 10 Hz. Specimens were 15.2 cm×2.54 cm. A 6.4 mm diameter hole was drilled in the center of the specimens to create a notch prior to testing.

5. Micro-debond Analyses

Fibers, both sized and unsized, were used in micro-debond tests to determine the interfacial shear strength between the fibers and the matrices. Samples for microdroplet micro-debond tests were prepared by applying a small droplet of the vinyl ester resin onto the carbon fiber that had been sized with each respective sizing (and also the unsized fiber). Then the droplets were cured and debonded via an Instron 5567 instrument at a displacement rate of 0.3 mm/min. The debonding load was measured using a balance (Mettler BB 2400) together with a personal computer to record load and deflection data. The interfacial shear strength was calculated from the debonding load, fiber diameter and embedded fiber length as the load required to debond the droplet per unit of fiber surface area covered by the droplet. At least 50 droplets were debonded for each material and the results were averaged.

6. X-ray Photoelectron Spectroscopy (XPS)

Fibers were analyzed using a Perkin Elmer PHI 6400 X-ray photoelectron spectrometer operating at 17.9 V with a sampling angle of 45°. Peak binding energy positions were referenced to carbon at 285 eV bond energy as 532.9, 102.1, and 400.3 eV for oxygen, silicon, and nitrogen respectively. The atomic concentration of each was analyzed based on peak areas.

RESULTS AND DISCUSSION

The objective of the present study was to relate composite fatigue properties and interfacial shear strengths of a series of carbon fiber reinforced vinyl ester matrix composites to sizing and interphase structure. Carbon fibers derived from a poly(acrylonitrile) precursor were surface treated by the supplier (Hexcel), sized in our laboratories with a series of physically similar poly(hydroxyether) thermoplastics, and used as the reinforcing fibers with a vinyl ester-styrene matrix. It should be noted that the term "vinyl ester" refers to a family of matrix resins comprised of oligomeric poly (hydroxyether) backbones having methacrylate endgroups which are diluted with styrene monomer. The molecular weight of the vinyl ester prepolymer and the amount of styrene can be varied. For this study, the number average molecular weight of the dimethacrylate (vinyl ester) prepolymer was ≈700 g/mole and this was diluted with 30 weight percent styrene. It is important that the constituents and concentrations of the particular resin composition are specified because the solubility of the sizings in the resin (and hence, the amount of sizing-resin interdiffusion) differs as resin composition is varied within the "vinyl ester" family.

The surface chemistry of the carbon fiber would be expected to affect fiber-sizing adhesion. Thus, the atomic composition (counting all atoms except hydrogen) of the unsized carbon AS-4 fibers was characterized using X-ray photoelectron spectroscopy. These analyses indicated that the fiber surface was 80–85 atomic % carbon. Nitrogen and silicon were both found on the surface in ≈1–3 atomic % along with a significant amount, 10–15 atomic %, of oxygen. The oxygen is believed to be bonded to carbon as ether linkages or hydroxyl groups because no higher binding energy shoulder on the oxygen peak representing doubly bonded oxygens was observed. It is assumed that the relatively high oxygen concentration originated from the proprietary surface treatment applied by the supplier.

The choices of sizing materials (FIG. 2) were based on the anticipated need for (1) limited (but finite) solubility in the matrix resin during cure, (2) tough, ductile mechanical properties in the interphase region, and (3) to have strongly hydrogen bonding groups (e.g., acidic hydroxyl groups) in the polymer chain to enhance fiber-sizing adhesion. The "limited solubility" characteristic between sizing and matrix resin was an attempt to control sizing-matrix interdiffusion to maintain an interphase region containing the ductile thermoplastic, yet have sufficient interdiffusion to achieve good sizing-matrix adhesion. Both sizings (FIG. 2), the carboxy modified poly(hydroxyether) and the poly (hydroxyether ethanolamine), had similar chemical structures to the vinyl ester prepolymer component of the matrix resin but neither sizing was soluble in the matrix resin at room temperature. The relatively non-polar styrene diluent in the matrix resin probably reduces the polarity of the resin sufficiently to contribute to this insolubility at room temperature.

Figure 4A:
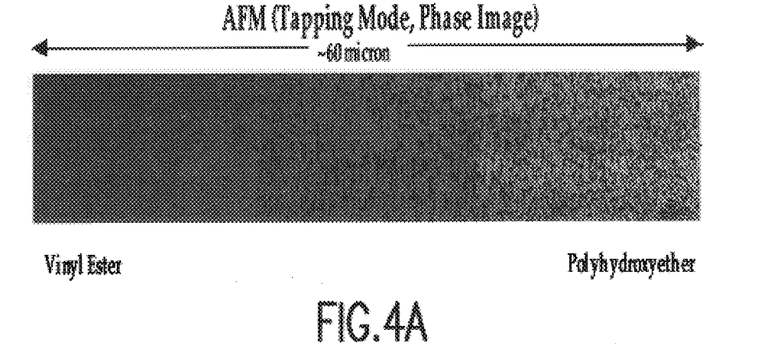
FIG. 4. Atomic force microscopy images (tapping mode, phase image) of sizing-matrix bilayer cross-sections illustrating relative interdiffusion of sizing with matrix: (A) Unmodified poly(hydroxyether), (B) Carboxy modified poly(hydroxyether) sizing, and (C) Poly(hydroxyether ethanolamine) sizing.
Figure 4B:
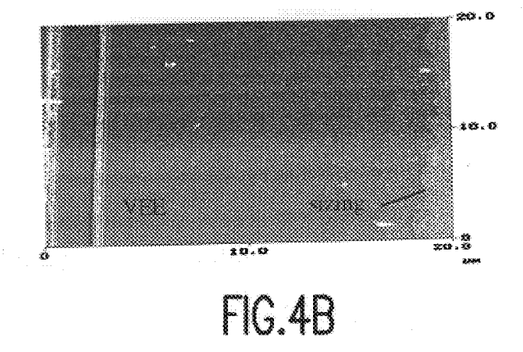
Figure 4C:
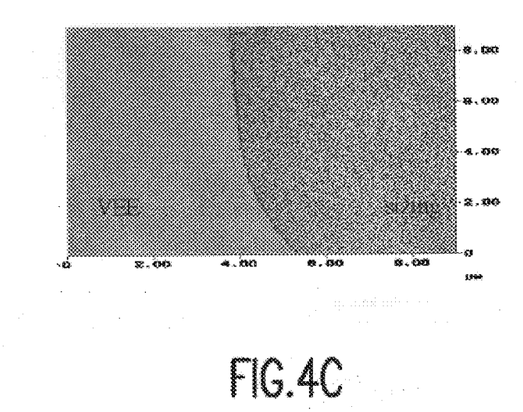

Interphase regions between the sizings and matrix were examined to try and relate the structure of these regions to composite fatigue performance. The interdiffusion and resultant morphology of interphase regions between each sizing material and the vinyl ester network were examined by constructing bilayer sizing material-matrix samples (FIG. 3), then microtoming cross-sections and studying them using atomic force microscopy (FIG. 4). The relative amounts of interdiffusion between the sizings and the vinyl ester matrix decreases in the order unmodified poly (hydroxyether)>carboxy modified poly(hydroxyether)>poly (hydroxyether ethanolamine) (no visible interdiffusion). The interdiffused sections of the interphase regions for both the unmodified and carboxylic acid modified poly (hydroxyether) sizings consisted of a homogeneous dispersion of relatively spherical inclusions 80–90 nm. In diameter of the poly(hydroxyether) materials embedded in the vinyl ester continuous matrix. Apparently these sizings partially dissolve in the matrix resin at the elevated cure temperature and phase segregate as the network forms (i.e., as high molecular weight is achieved). The small size of the inclusions may be related to the fact that full cure takes place under the conditions used within about 3–5 minutes and "macroscale" phase segregation is likely inhibited by the rapid reaction kinetics. The morphology of the small inclusions comprised of the ductile thermoplastic distributed in the crosslinked matrix network may be related to the enhanced composite properties.

The polarity of the sizing materials increases in the order unmodified poly(hydroxyether)<carboxy modified poly (hydroxyether)<poly(hydroxyether ethanolamine). Thus, the solubility parameter difference between each sizing and the matrix increases in the same order. This is reflected in the images in FIG. 4 showing that more interdiffusion resulted as the solubility parameter difference between sizing material and matrix decreased. An ≈30 µm compositional gradient was evident in the unmodified poly(hydroxyether) bilayer as compared to the much smaller gradient region for the carboxy modified poly(hydroxyether), and no interdiffusion was evident for the more polar poly(hydroxyether ethanolamine) sizing.

The fatigue properties of composites from these materials are far superior for the case of the carboxy modified poly (hydroxyether) sizing. Thus, the enhanced composite fatigue results may indeed be dependent on having a sizing with limited, but finite, solubility in the matrix resin during cure.

Interphase Property Variations

One longer-term objective of our work is to measure material properties variations across the interphase regions, then to relate these interphase characteristics to failure mechanisms in the composites. A goal is to develop a life prediction model that includes interphase properties (particularly gradients in properties across this region). One property of particular interest is the variation of yield strength across the interphase region. Information about yield strength within the interphase region can assist in establishing failure criteria. The portion of this project described in this paper represents the initial stages of work where interphase profiles for sizing-matrix bilayers (no fibers present yet) have been probed and plastic deformation as a function of position is reported.

Figure 5:
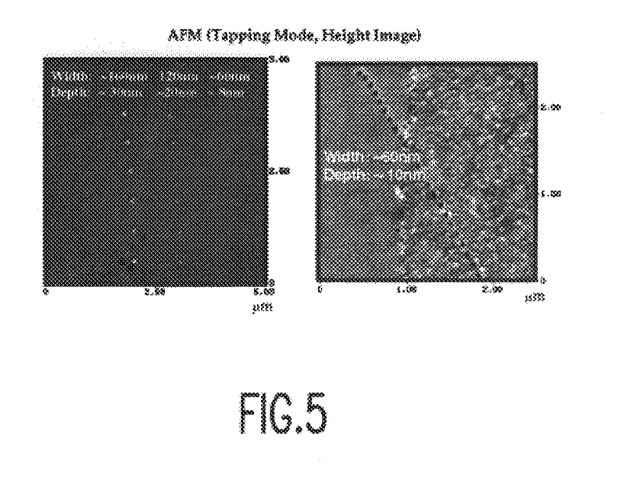
FIG. 5. Atomic force microscopy image (tapping mode, height image) of indentations across an interphase region of a vinyl ester-carboxy modified poly(hydroxyether) bilayer.
Figure 6:
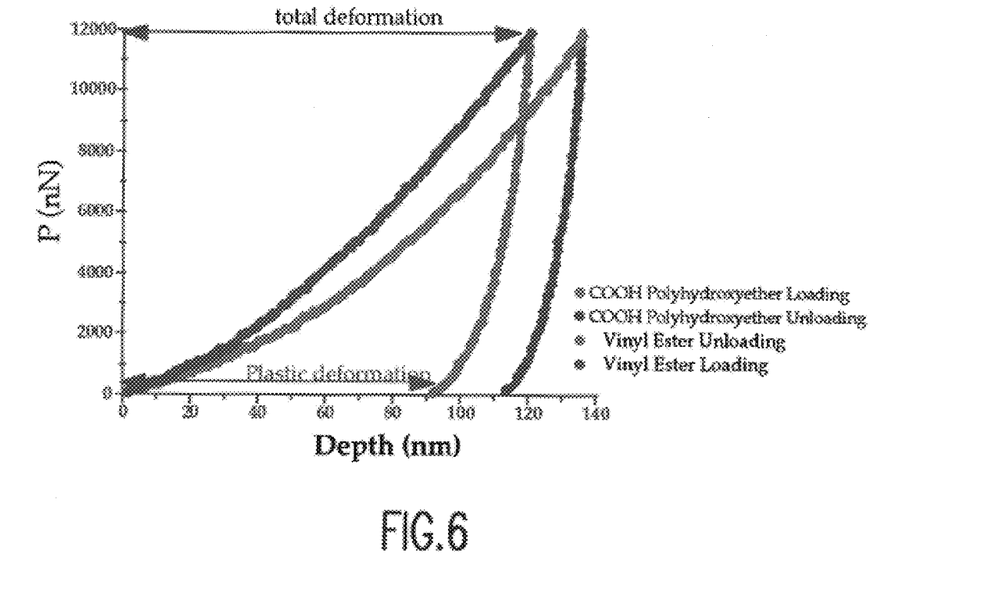
FIG. 6. Force curves for a) Vinyl ester matrix and b) Carboxy modified poly(hydroxyether).

A nano-indentation technique using the AFM apparatus was used to profile the compositions in the interphase regions for the vinyl ester-poly(hydroxyether) bilayers and first attempts have been made at separating the plastic and elastic components of the deformations (11). An example of this is depicted in FIG. 5, which shows a number of indentations across an interphase region. Force-indentation depth curves for each point across the interphase regions were derived from these measurements by programming the apparatus to indent until a set force was reached, retract, then to repeat the same process 750 nm removed. This insured that each successive indent was well removed from the stress field of the preceding indent. FIG. 6 depicts examples of force-distance curves from indentations across the carboxy modified poly(hydroxyether) sizing-vinyl ester matrix sample. The force-distance curves for the poly(hydroxyether ethanolamine) were similar to those for the carboxy modified poly(hydroxyether). This was expected because of the chemical similarity of these two materials. As each position was indented, the force increased with depth due to a combination of plastic and elastic deformation; then the force decreased as the tip was retracted. The hysteresis between the indention and retraction curves is attributed to plastic deformation (taking into consideration a scaling factor dependent on AFM tip geometry). The plastic component was calculated by extrapolating the initial slope of the unloading curve back to zero force. Then the plastic depth was subtracted from the total depth at maximum force to obtain the elastic component. The results reported herein are considered as "initial results" of an ongoing study. It was noticed that for all indents that there was a "pile-up" of material around the top of the indentation (FIG. 6). The degree of "pile-up" varied across the interphase region with the thermoplastic sizing materials showing a larger amount than the thermoset. This phenomenon is attributed to material actually being moved out of the hole during indentation. This may affect the absolute values of the depths since attempts have been made to differentiate the elastic and plastic components of the indentation response, but it is not expected to change the general trends for each component across the interphases.

Figure 7:
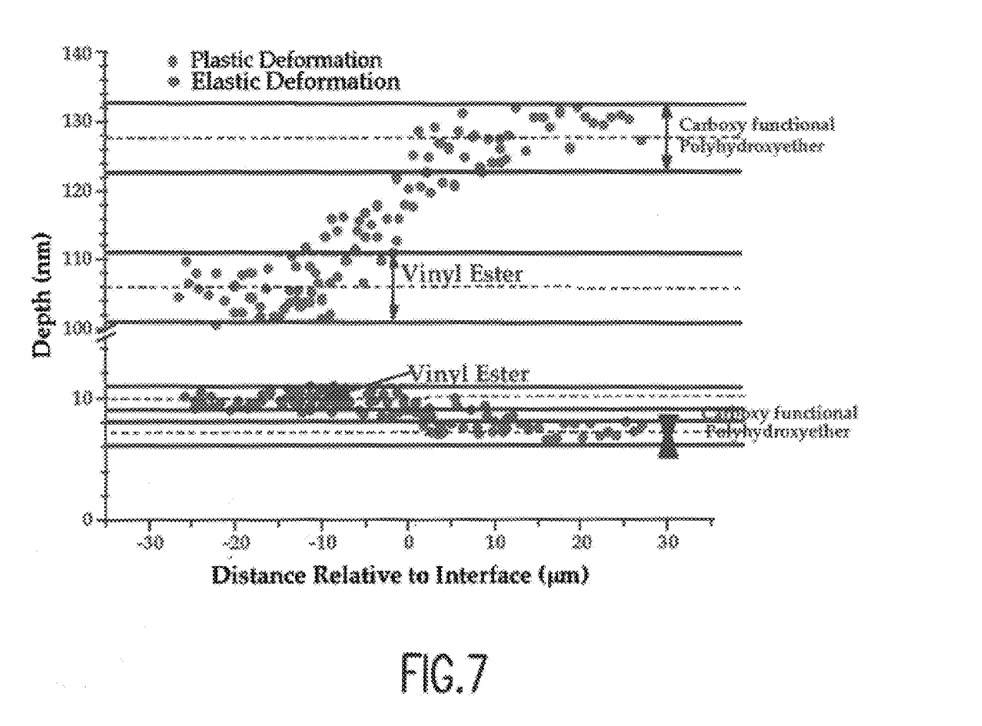
FIG. 7. Atomic force microscopy image (tapping mode, phase image) of a composite cross-section where the sizing material is the carboxy modified poly(hydroxyether).
Figure 8:
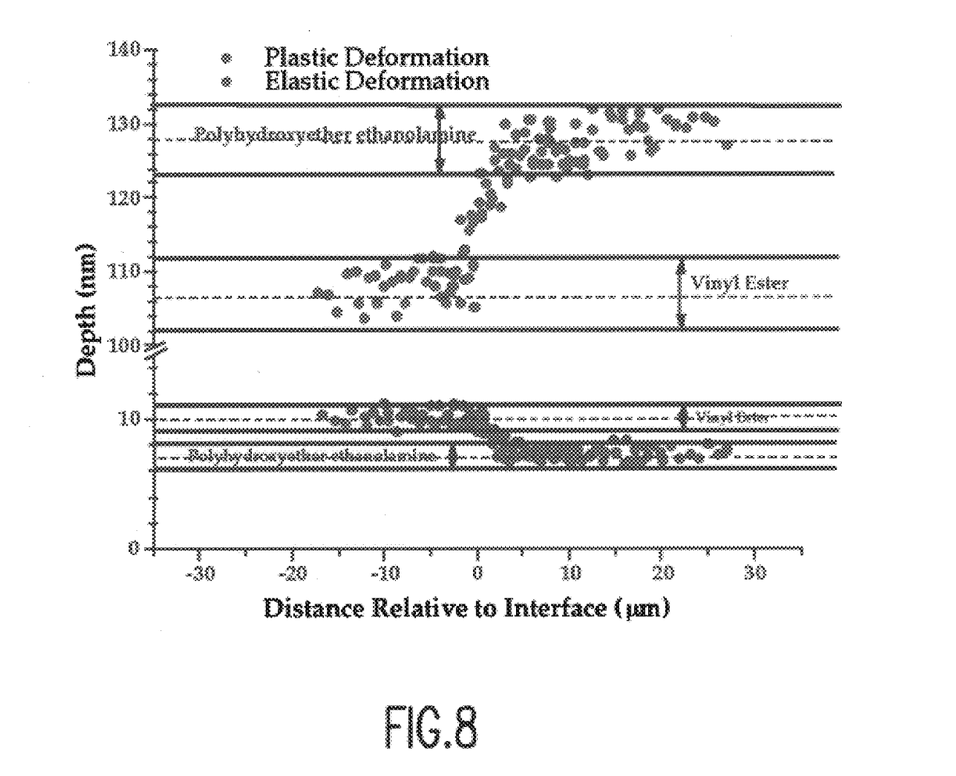

As expected, the data indicated that the depth of the indent was greater for the thermoplastic carboxy modified poly (hydroxyether) and that it also had a larger degree of plastic deformation relative to the thermoset vinyl ester. The plastic and elastic components of the indentations made across the interphase region of the carboxy modified poly (hydroxyether)-vinyl ester bilayer are depicted in FIG. 7. The dotted lines in FIG. 7 represent average values (for at least 10 indentations) for indentation in the vinyl ester and modified polyhydroxyether, while the solid lines represent 2 standard deviations from these average values. The indents increase in depth from the vinyl ester to the carboxy modified poly(hydroxyether) side of the bilayer, and the depth of the plastic component of the indents also increase. The data also indicates a gradient across the interphase which extends ≈10–15 μm from the vinyl ester to the interface and ≈5 μm into the carboxy modified poly(hydroxyether) side of the bilayer. The zero point on the graphs was arbitrarily set as the point where the thermoset-thermoplastic interface was observed. This gradient, characterized using nano-indentation, on the vinyl ester side of the interphase corresponds well with the AFM image of this system. The process of interphase formation probably consists of the uncured vinyl ester resin swelling the carboxy modified poly (hydroxyether) and then for the latter to diffuse out into the vinyl ester material (7). Following this course, it is expected that the gradient in properties extends into the carboxy modified poly(hydroxyether) side of the interphase region as seen in the nano-mechanical data. In contrast to the ≈15–20 μm interphase observed in the carboxy modified poly (hydroxyether)-vinyl ester bilayer, the interphase region for the poly(hydroxyether ethanolamine) and the nano-mechanical data (FIG. 8) shows a sharper interphase of ≈1–2 μm. This is consistent with our qualitative observation that very poor adhesion exists between these two materials in the bilayers.

Figure 9:
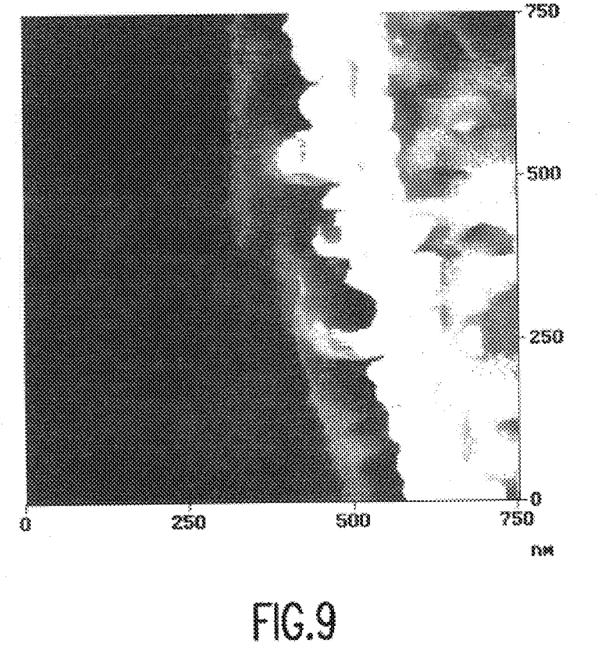
FIG. 9. Atomic force microscopy image of a composite cross-section where the sizing material is the carboxy modified poly(hydroxyether).
Figure 10:
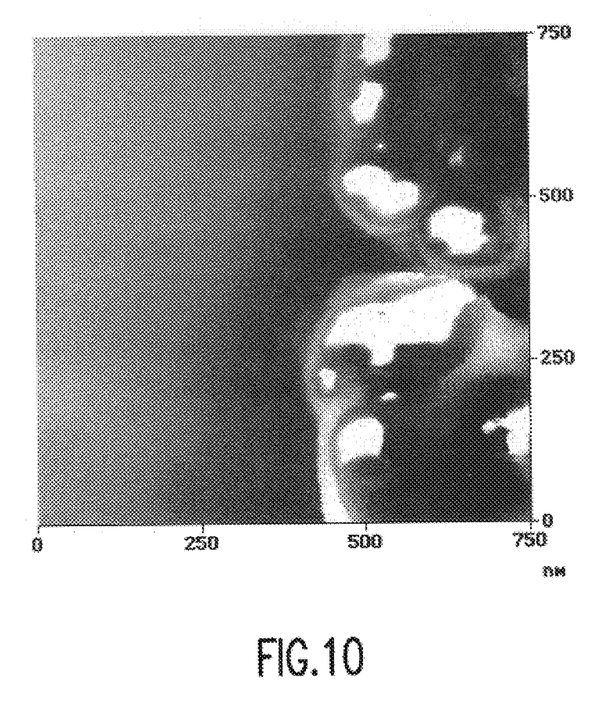
FIG. 10. Atomic force microscopy image of a single fiber composite cross-section where the sizing material is a) unsized and b) carboxy modified poly(hydroxyether).
Figure 11:
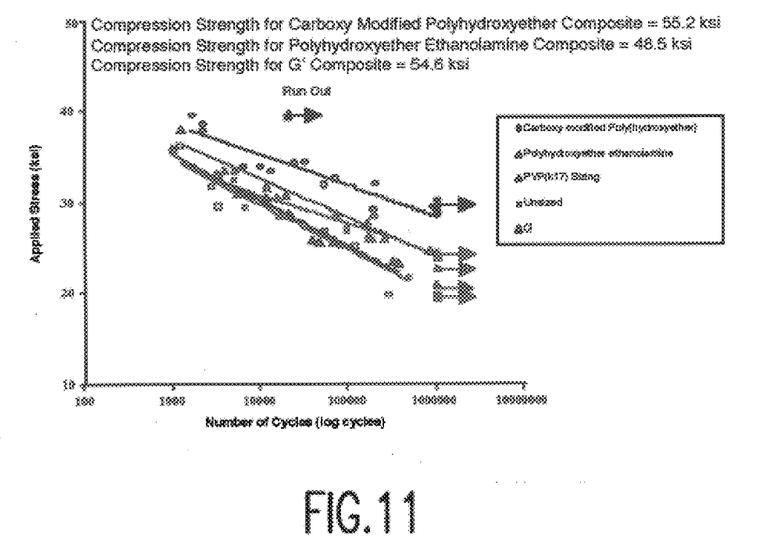
FIG. 11. Fatigue durability of carbon fiber reinforced vinyl ester matrix composites as a function of sizing chemical structure.

FIG. 9 illustrates an atomic force image of a polished composite cross-section with 0.8 weight % of the carboxy modified poly(hydroxyether) sizing. Although the image suggests a high quality composite and the interphase appears intact, no sizing layer is visible. By contrast, atomic force images of single fiber "model" composites (FIG. 10) do show a difference in the fiber-matrix interaction for an unsized and carboxy modified poly(hydroxyether) sized single fiber.

Interfacial Shear Strength

Interfacial shear strengths (IFSS) on "model" single fiber composites were measured using a microdroplet debond method. The average IFSS of the control samples prepared with unsized carbon fibers was 28 MPa (Table 1) whereas the values almost doubled for the carbon fibers coated with the poly(hydroxyether) and carboxy modified poly (hydroxyether) engineering

TABLE 1

Interfacial shear strengths measured via a microdroplet micro-debond method.

| Sizing | IFSS (MPa) |
|---|---|
| None | 28 ± 8 |
| Poly(hydroxyether) | 43.6 ± 8.7 |
| Carboxylic acid modified poly(hydroxyether) | 52.6 ± 4.7 |
| Poly(hydroxyether ethanolamine) | 22 | thermoplastics. This is consistent with good adhesion between these sizings and the vinyl ester matrix promoted by interdiffusion of these layers during cure (observed using AFM). The acidic protons from the hydroxyl and carboxyl groups on the sizing backbones may also enhance fiber-sizing adhesion. Further investigations of these adhesion mechanistic aspects are warranted and will be the subject of a future publication. As the more polar polymer of the two, the carboxy modified poly(hydroxyether) was less soluble in the resin, the interdiffused interphase region observed by AFM was narrower, and it also yielded the largest IFSS. This may be related to the necessity to control interdiffusion in the composites to ensure that a substantial amount of sizing indeed remains at the interface. Thus, interdiffusion studies will also be investigated further. In contrast to the encouraging results obtained with the carboxy modified poly (hydroxyether), the samples prepared from the fibers sized with the poly(hydroxyether ethanolamine) provided almost the same IFSS as the control samples. This indicates poor adhesion, possibly between the vinyl ester network and the poly(hydroxyether ethanolamine). Consistent with this result, the AFM micrographs indicate little to no interdiffusion between this very polar sizing and the vinyl ester thermoset.

Composite Characterization

Composite panels $(0°/90°)_{7s}$ were prepared with each of the two sizings and fully reversed (R=−1) notched fatigue tests were used to compare the as-processed fatigue lives as a function of the amount of sizing-matrix interdiffusion. Composite fatigue performance has previously been identified as being particularly sensitive to changes in the fiber-matrix interface (4). Improved fatigue performance is noted by a decrease in the slope of the S-N curve and increases in the stress level that defines the fatigue limit, i.e. the stress level at which the material survives $10^6$ cycles. Significantly, by placing only 0.7 wt. % of the carboxy modified poly (hydroxyether) at the interface, an ≈50% increase in fatigue limit resulted as compared to the unsized material. By comparison, the poly(hydroxyether ethanolamine) interphase does not lead to same level of durability enhancement. Enhanced fatigue limits for both sets of sized fiber composites relative to the unsized case were measured even though fiber-matrix adhesion for the poly(hydroxyether ethanolamine) materials was low. It is clear that the slopes of the S-N curves are reduced for both sized systems relative to the unsized case. However, one can clearly see that at low cycle fatigue, the composite with the poly(hydroxyether ethanolamine) sizing does not outperform the unsized case. This may be associated with strength issues where the interface is so poor that it cannot prevent microbuckling at the stress concentration. However, at lower stress levels, the weak interface facilitates the growth of splits at the notch, the effect of the stress concentration is reduced, and therefore the stress level in the material is not high enough to precipitate compression failure.

SUMMARY OF EXAMPLE

Interphase regions have been designed for carbon fiber reinforced vinyl ester matrix composites with a series of tough, ductile, thermoplastic sizings having systematically varied chemical polarities. These materials interdiffuse with the vinyl ester matrix during cure to achieve sizing-matrix adhesion. The relative amounts of interdiffusion have been characterized using atomic force microscopy and qualitatively correlated to composite fatigue properties. With as little as 0.7% by weight of a carboxy modified poly (hydroxyether) sizing in the composite, the fatigue limit for applied stress can be improved by about 50% over the unsized fiber case.

REFERENCES

1. G. Gray and G. Savage, "Advanced Thermoplastic Composite Materials," Metals and Materials, 5, 513, (1989).
2. L. T. Drzal, M. J. Rich, and P. F. Lloyd, "Adhesion of Graphite Fibers to Epoxy Matrices: 1. The Role of Fiber Surface Treatment," J. Adh. 16, 90, (1982).
3. J. J. Lesko, R. E. Swain, J. M. Cartwright, J. W. Chen, K. L. Reifsnider, D. A. Dillard, and J. P. Wightman, "Interphases Developed from Fiber Sizings and their Chemical-Structural Relationship to Composite Performance," J. Adh., 45, 43, (1994).
4. J. J. Lesko, A. Rau, and J. S. Riffle, "The Effect of Interphase Properties on the Durability of Woven Carbon/Vinyl Ester Matrix Composites," Proc. 10th Am. Soc. Comp., Sep. 18–20, 1995, 53–62.
5. N. S. Broyles, K. E. Verghese, S. V. Davla, H. Li, R. M. Davis, J. J. Lesko, and J. S. Riffle, "Designed Polymeric Interphases in Carbon Fiber-Vinyl Ester Composites, " Polymer (London), 39(15), 3417–3424 (1998).
6. N. S. Broyles, R. Chan, R. M. Davis, J. J. Lesko, and J. S. Riffle, "Sizing and Characterization of Carbon Fibers with Aqueous Solutions of Poly(vinylpyrrolidone)," Polymer (London), 39(12), 2607–2613 (1998).
7. M. B. Bump, M. A. F. Robertson, N. S. Broyles, M. C. Flynn, K. E. Verghese, J. J. Lesko, and J. S. Riffle "Designed Polymeric Interphases for Vinyl Ester Composites," Proc. Int. Comp. Expo '98, Session 20-D, 1998.
8. Hercules AS-4 Product Literature, Hercules Incorporated.
9. H. Li, E. Burts, K. Bears, Q. Li, J. J. Lesko, D. A. Dillard, and J. S. Riffle, "Network Structure and Properties of Dimethy acrylate-Styrene Matrix Materials," submitted to Journal of Composite Materials, 1998.
10. M. R. Vanlandingham, S. H. McKnight, G. R. Palmese, J. R. Elinge, X. Huang, T. A. Bogetti, R. F. Eduljee and J. W. Gillespie, Jr. "Nanoscale Indentation of Polymer Systems using the Atomic Force Microscope," J. Adh., 64, 31, (1997).
11. G. M. Pharr, W. C. Oliver and F. R. Brotzen "On the Generality of the Relationship among Contact Stiffness, Contact Area, and Elastic Modulus during Indentation," J. Mat. Res., 7, 1564, (1992).
12. T. Y. Taul, W. C. Oliver, and G. M. Pharr, "Nanoindentation of Soft Films on Hard Substrates: The Importance of Pile-Up," Mat. Res. Soc. Symp. Proc. Vol. 436, 207–212 (1997).
13. A. Bolshakov, W. C. Oliver, and G. M. Pharr, "Finite Element Studies of the Influence of Pile-Up on the Analysis of Nanoindentation Data," Mat. Res. Soc. Symp. Proc. Vol. 436, 141–146 (1997).

We claim:

1. A composite material, comprising: carbon fibers embedded in a polymeric matrix comprising a thermoset resin, wherein said carbon fibers are precoated with a polyhydroether sizing agent before being embedded in said polymeric matrix.

2. The composite material according to claim 1, wherein said thermoset resin is selected from the group consisting of unsaturated polyester resins, vinyl ester resins, phenolic resins, thermosetting polyimides, epoxidized novolak, and polyurethane resins.

3. The composite material according to claim 1, wherein said thermoset resin comprises an unsaturated polyester resin.

4. The composite material according to claim 1, wherein said thermoset resin comprises a vinyl ester resin.

5. The composite material according to claim 1, wherein said thermoset resin comprises a phenolic resin selected from the group consisting of phenol-formaldehyde, phenol-furfural, phenol-acetaldehyde, and epoxidized novolak.

6. A carbon fiber-reinforced composite, comprising: presized carbon fibers embedded in a polymeric matrix with an interphase region located between surfaces of said carbon fibers and said polymeric matrix, wherein said carbon fibers are sized with a polyhydroether sizing agent prior to being embedded in said vinyl ester matrix and at least substantially all of said sizing agent is located in said interphase region between said surfaces of said carbon fibers and said vinyl ester matrix.

7. A process for making a carbon fiber-reinforced composite material, comprising the steps, in this sequence, of:

(a) coating carbon fibers with an aqueous dispersion containing a polyhydroxyether dispersed in a volatizable liquid vehicle;

(b) drying said aqueous sizing solution effective to volatize at least substantially all said liquid vehicle to form sized carbon fibers;

(c) embedding said sized carbon fibers in a thermosetting resin system to provide an intermediate product; and (d) heating said intermediate product effective to cross-link said thermosetting resin system to form a solidified, thermoset resin matrix attached to said carbon fibers.

8. The process according to claim 7, wherein said thermosetting resin system is selected from the group consisting of unsaturated polyester resins, vinyl ester resins, phenolic resins, thermosetting polyimides, epoxidized novolak, and polyurethane resins.

* * * * *

UNITED STATES PATENT AND TRADEMARK OFFICE
CERTIFICATE OF CORRECTION

PATENT NO. : 6,020,063
DATED : February 1, 2000
INVENTOR(S) : Judy S. Riffle, John J. Lesko, Norman Broyles, Stephen V. Davis, and Nikhil Vergehese It is certified that error appears in the above-identified patent and that said Letters Patent is hereby corrected as shown below:

In column 4 at line 8, prior to "also" please insert --(--;
In claim 1, column 18 at line 18 please delete "polyhydroether" and insert --polyhydroxyether--; and
In claim 6, column 18 at line 38 please delete "polyhydroether" and insert --polyhydroxyether--.

Signed and Sealed this

Fourteenth Day of November, 2000

Attest:

Q. TODD DICKINSON

*Attesting Officer*     *Director of Patents and Trademarks*